(12) United States Patent
Criaud et al.

(10) Patent No.: US 9,718,508 B2
(45) Date of Patent: Aug. 1, 2017

(54) METHOD FOR PRODUCING AND INSTALLING A FRONT END OF A MOTOR VEHICLE

(71) Applicant: RENAULT s.a.s., Boulogne-Billancourt (FR)

(72) Inventors: Claude Criaud, Levallois-Perret (FR); Matthieu Ouali, Saint Nicolas de la Taille (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 305 days.

(21) Appl. No.: 14/435,025

(22) PCT Filed: Oct. 9, 2013

(86) PCT No.: PCT/FR2013/052407
§ 371 (c)(1),
(2) Date: Apr. 10, 2015

(87) PCT Pub. No.: WO2014/057217
PCT Pub. Date: Apr. 17, 2014

(65) Prior Publication Data
US 2015/0266529 A1 Sep. 24, 2015

(30) Foreign Application Priority Data
Oct. 10, 2012 (FR) ...................... 12 59660

(51) Int. Cl.
*B62D 25/08* (2006.01)
*B62D 65/16* (2006.01)
(Continued)

(52) U.S. Cl.
CPC ............. *B62D 65/16* (2013.01); *B60Q 1/045* (2013.01); *B62D 25/08* (2013.01); *B62D 25/082* (2013.01);
(Continued)

(58) Field of Classification Search
CPC ...... B62D 65/16; B62D 65/04; B62D 65/024; B62D 65/02; B62D 25/085; Y10T 29/49904; Y10T 29/49622
See application file for complete search history.

(56) References Cited

U.S. PATENT DOCUMENTS 6,382,709 B1 * 5/2002 Chirifu ................... B60R 19/24
276/29
8,567,853 B2 * 10/2013 Huber ..................... B60R 19/24
293/120

(Continued)

FOREIGN PATENT DOCUMENTS

| EP | 1 398 249 | 3/2004 |
| FR | 2 879 553 | 6/2006 |
| WO | 2009 071244 | 6/2009 |

OTHER PUBLICATIONS

International Search Report Issued Mar. 3, 2014 in PCT/FR13/052407 Filed Oct. 9, 2013.

(Continued)

*Primary Examiner* — Jermie Cozart
(74) *Attorney, Agent, or Firm* — Oblon, McClelland, Maier & Neustadt, L.L.P.

(57) ABSTRACT

A method for producing and installing a front end of a motor vehicle, including an arrangement including a structural front surface forming a structure that supports engine-cooling elements, to which structure a front protective molding and the projector headlamps are attached. In addition, the vehicle includes a hood hinged on hinge brackets secured to the vehicle structure, and side wings connected to the front pillar lining of the vehicle structure. The method includes adjusting the structural front surface in the transverse direction to a transverse position determined relative to the hood, placing a gauge device between the hood and the front structural face.

7 Claims, 3 Drawing Sheets

Figure 1:
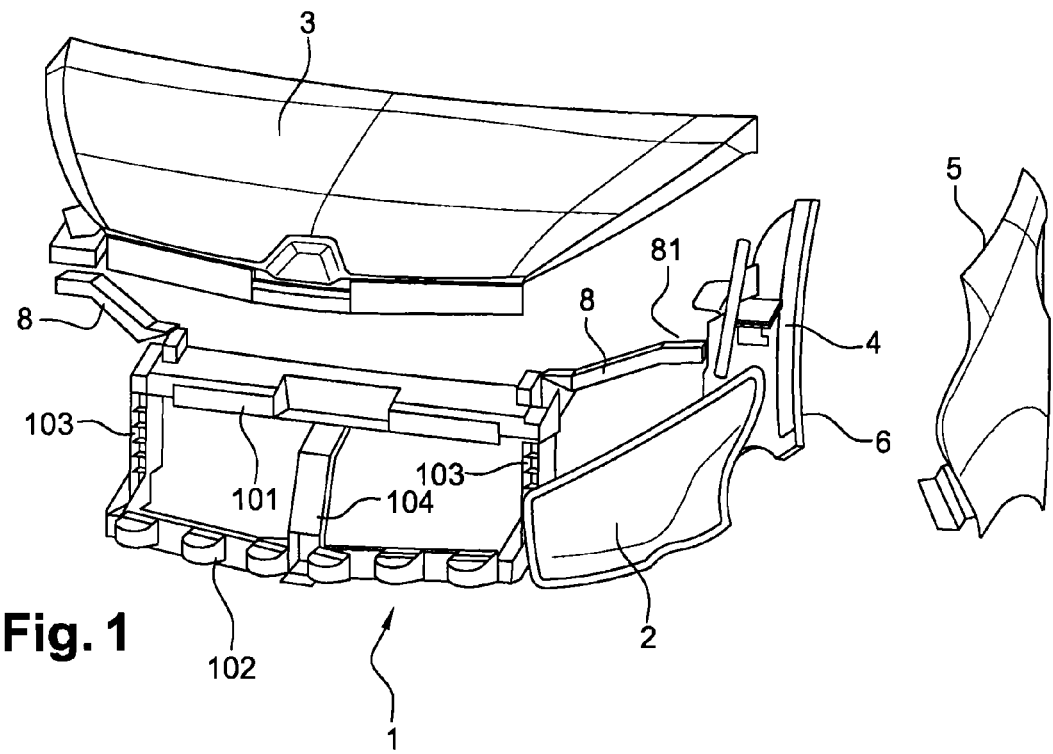

(51) Int. Cl.
*B62D 65/04* (2006.01)
*B60Q 1/04* (2006.01)
*B62D 65/02* (2006.01)

(52) U.S. Cl.
CPC ......... *B62D 25/085* (2013.01); *B62D 65/024*
(2013.01); *B62D 65/04* (2013.01); *B62D 65/02*
(2013.01); *Y10T 29/49622* (2015.01); *Y10T*
*29/49904* (2015.01)

(56) References Cited

U.S. PATENT DOCUMENTS

| | | | |
|---|---|---|---|
| 2005/0206200 A1* | 9/2005 | Tazaki | B62D 65/16 296/203.02 |
| 2007/0091624 A1 | 4/2007 | Takata et al. | |
| 2008/0157563 A1 | 7/2008 | Crane et al. | |

OTHER PUBLICATIONS

French Search Report Issued Jun. 28, 2013 in Application No. FR 1259660 Filed Oct. 10, 2012.

\* cited by examiner

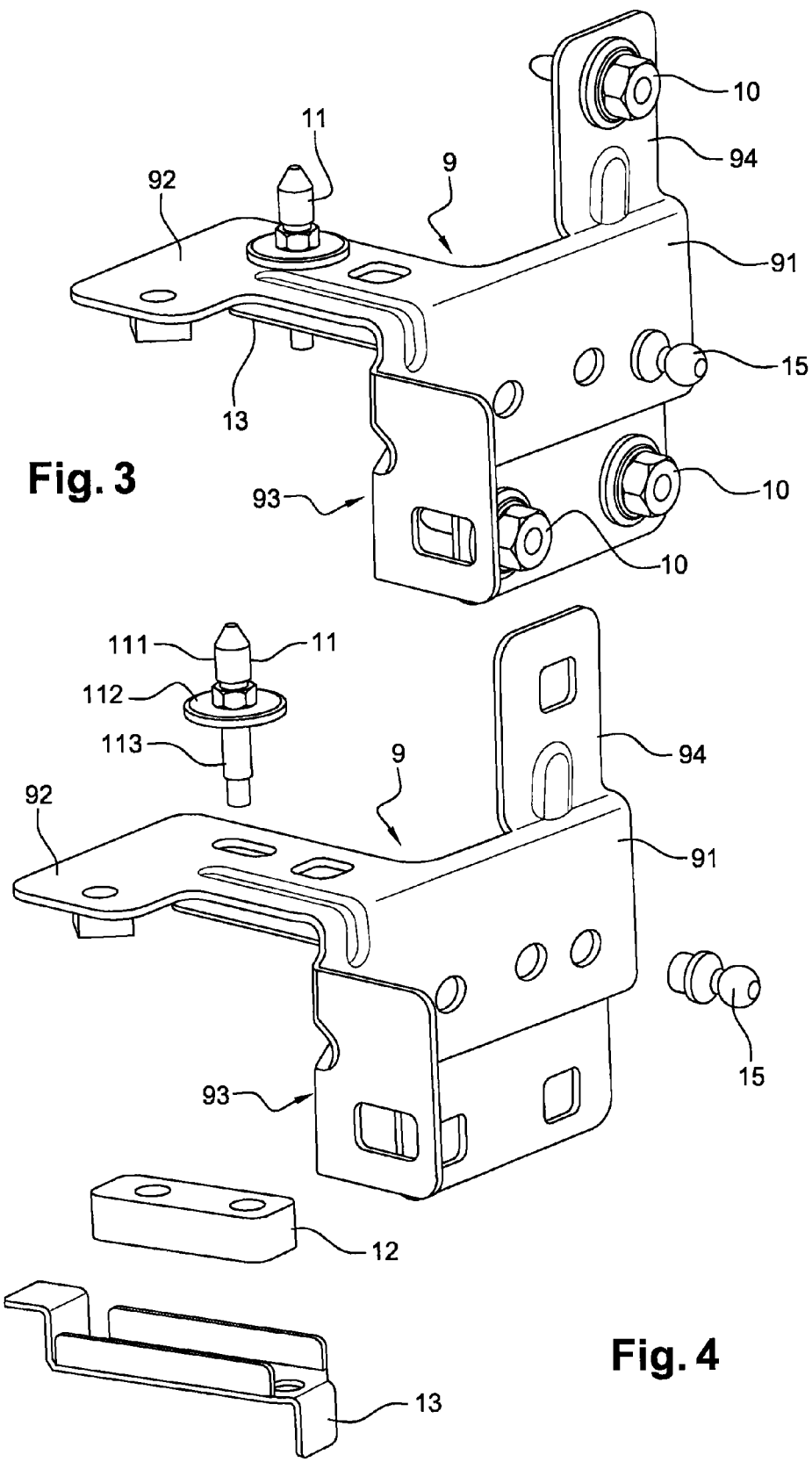

METHOD FOR PRODUCING AND INSTALLING A FRONT END OF A MOTOR VEHICLE

FIELD OF THE INVENTION

The present invention relates to the arrangement of a front end of a motor vehicle comprising a structural front surface.

PRIOR ART AND PROBLEM ADDRESSED

The structural front surface is a structure of which the purpose is to support different components at the front of the vehicle and primarily the radiator of the engine block. Further elements or components of the front end of the vehicle or engine block are fixed to this structure, in particular the front headlights, protective molding, the hood lock, etc. The front end of the vehicle also comprises a hood for closing the engine compartment, said hood being hinged on hinge brackets secured to the structure of the vehicle. The front end also comprises side fenders connected to front pillar linings of the vehicle, which are elements of the structure of the metal bodywork of the vehicle, i.e. of the body in white provided from the production stage referred to as "metalworking". The front pillar linings are thus rigid and structural parts located at the front portion of the framing of the front door of the vehicle, on each side of the vehicle. The front fenders of the vehicle are side body parts bordering at least in part the front wheel arches of the vehicle. These fenders are indexed and fixed to the front pillar linings. The term indexed is understood to mean "placed in position in relation to a second element". It is also noted that the hood is connected to the structure of the vehicle via hinges fixed on hinge brackets, in turn secured to the structure at the upper portion of the front pillar linings.

On the other hand, as mentioned above, the structural front surface constitutes an element for indexing and fixing front headlights and other components (protective molding, radiator grille, etc.). The front headlights are conventionally placed between the hood and the corresponding side fenders, such that the clearances and alignments are essential parameters to be controlled between the corresponding edges of the hood, the headlights and the fenders, in particular in the direction transverse to the vehicle. The front pillar linings are placed in position with positioning tolerances that may reach +/−2 mm, which does not make it possible for these to be used as suitable references. Solutions have already been proposed for ensuring a placement in position of some of these elements relative to one another. For example document EP 2 221 217 A2 describes a device for the direct indexing of headlights on the structural front surface. Document FR 2 952 341 describes a fixing of the hood and of the fender on the same common piece, making it possible to control the clearances and alignment essentially in the vertical direction. In addition, systems having pieces making it possible to index the structural front surface in relation to the front pillar linings have been used. However, these solutions are not optimized, particularly for indexing in the direction transverse to the vehicle, which is the most difficult to control. In addition, the known solutions provide a flawed indexing of the structural front surface in relation to the hood.

OBJECTIVE OF THE INVENTION

The objective of the invention is to overcome all or some of the above disadvantages by proposing an arrangement of a vehicle front end and a production and installation method that guarantee an improved control of the clearances and alignments between the corresponding edges of the hood, the headlights, and the fenders. In order to more clearly express the object of the invention, the orientations are given with reference to the conventional XYZ coordinate system of the vehicle, in which X represents the front-rear longitudinal direction of the vehicle, oriented toward the rear, Y represents the transverse direction of the vehicle, oriented toward the right, and Z represents the vertical direction upwards.

OBJECT OF THE INVENTION

To this end, the invention relates to a method for producing and installing a front end of a motor vehicle having an arrangement comprising a structural front surface forming a structure supporting engine-cooling elements, to which structure a front protective molding of the vehicle and front headlights are fixed, the vehicle also comprising a hood hinged on hinge brackets secured to the structure of the vehicle, and side fenders connected to front pillar linings of the structure of the vehicle, the structural front surface being fixed in the lower portion thereof to the structure of the vehicle via lower brackets secured to the side frames of the vehicle, shaped so as to ensure an indexing in the longitudinal direction, the structural front surface comprising in the upper portion side arms, of which the opposite ends are fixed to the front pillar linings by means of fixing brackets shaped so as to ensure a direct indexing of at least one of the ends in the longitudinal and vertical directions with a degree of freedom in the transverse direction allowing an adjustment of said end to a transverse position determined relative to the hood, characterized in that said method comprises the following steps:

placing in position, assembling and fixing structural parts of the vehicle, in particular comprising front pillar linings, hood hinge brackets, fixing brackets, and lower brackets of the structural front surface, placing the hood in position on the hinge brackets, placing the structural front surface in position by a direct indexing of at least one of the ends of the arms in the longitudinal and vertical directions with a degree of freedom in the transverse direction allowing an adjustment of said end in this transverse direction, adjusting the end and the structural front surface in the transverse direction to a transverse position determined relative to the hood by placing a template between the hood and this end, fixing ends of the side arms on the fixing brackets in the determined transverse position by tightening an indexing and clamping screw cooperating with a tapped block, and also fixing the lower portion of the structural front surface on the lower brackets.

The structural front surface is thus placed perfectly and easily in geometric position in relation to the hood, which is used as reference means. The fender is also correctly placed in position with respect to the structure of the vehicle, such that the headlights indexed and fixed on the structural front surface, on a strip for connection to a corresponding fender and on the hood hinge brackets, are also correctly placed in geometric position. The clearances and alignments among the hood, the headlights and the fender are consequently controlled, that is to say are distributed regularly and correctly, in particular between the two sides of the vehicle.

In accordance with further advantageous features of the invention, the method also comprises the following steps:

fixing each headlight on a corresponding fixing bracket via connection means shaped so as to ensure a direct indexing in the longitudinal and vertical directions, fixing each headlight on a corresponding fender via a strip secured to the fender, shaped so as to ensure a direct indexing in the longitudinal direction, fixing each headlight on a lower portion of the structural front surface by connection means shaped so as to ensure a direct indexing in the longitudinal X, transverse Y and vertical Z directions, fixing each headlight on a corresponding hood hinge by means of connection means shaped so as to ensure a direct indexing in the transverse Y and vertical Z directions, each front headlight is fixed to the fixing bracket by connection means shaped so as to ensure a direct indexing in the longitudinal and vertical directions, is fixed to the fender by a strip shaped so as to ensure a direct indexing in the longitudinal direction, is fixed to the lower portion of the structural front surface by connection means shaped so as to ensure a direct indexing in the longitudinal, transverse and vertical directions, and is fixed to a hinge bracket of the hood shaped so as to ensure an indexing in the transverse and vertical directions, each fixing bracket comprises a vertical portion extending in a longitudinal vertical plane XZ, fixed to a front pillar lining of the vehicle, a horizontal plate extending at right angles toward the engine compartment of the vehicle, the plate comprising the screw cooperating with the tapped block detained in a cage secured to the plate so as to prevent rotation thereof about a vertical axis, the screw being intended to be threaded in an adjustment opening formed on the corresponding end of one of the side arms of the structural front surface, this opening extending in the transverse direction Y when the structural front surface is installed on the structure of the vehicle, each fixing bracket comprises a vertical fin extending in a transverse vertical plane opposite the engine compartment from a front edge of the vertical portion, a headlight being indexed in the longitudinal direction X whilst bearing against this vertical fin and fixed thereon by a screw passing through an opening formed in this fin in the transverse direction Y, each fixing bracket comprises, on the vertical portion thereof, a connection piece extending in the direction opposite the engine compartment, this piece having a spherical end making it possible to ensure a ball joint connection with a hood balancing jack placed between said hood and the fixing bracket, each fixing bracket is a part formed by deep drawing and bending, fixed to the corresponding front pillar lining by three fixing screws passing through the vertical portion and also a fixing tab extending above the vertical portion.

DETAILED DESCRIPTION OF THE INVENTION

Figure 2:
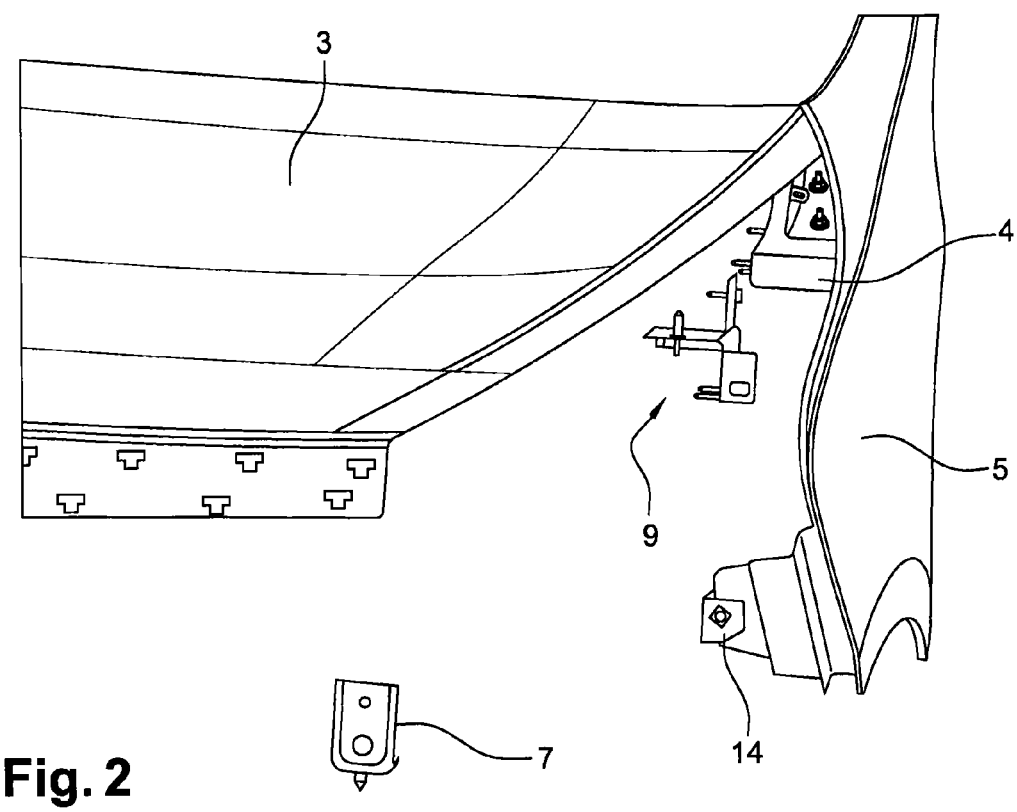
Figure 5:
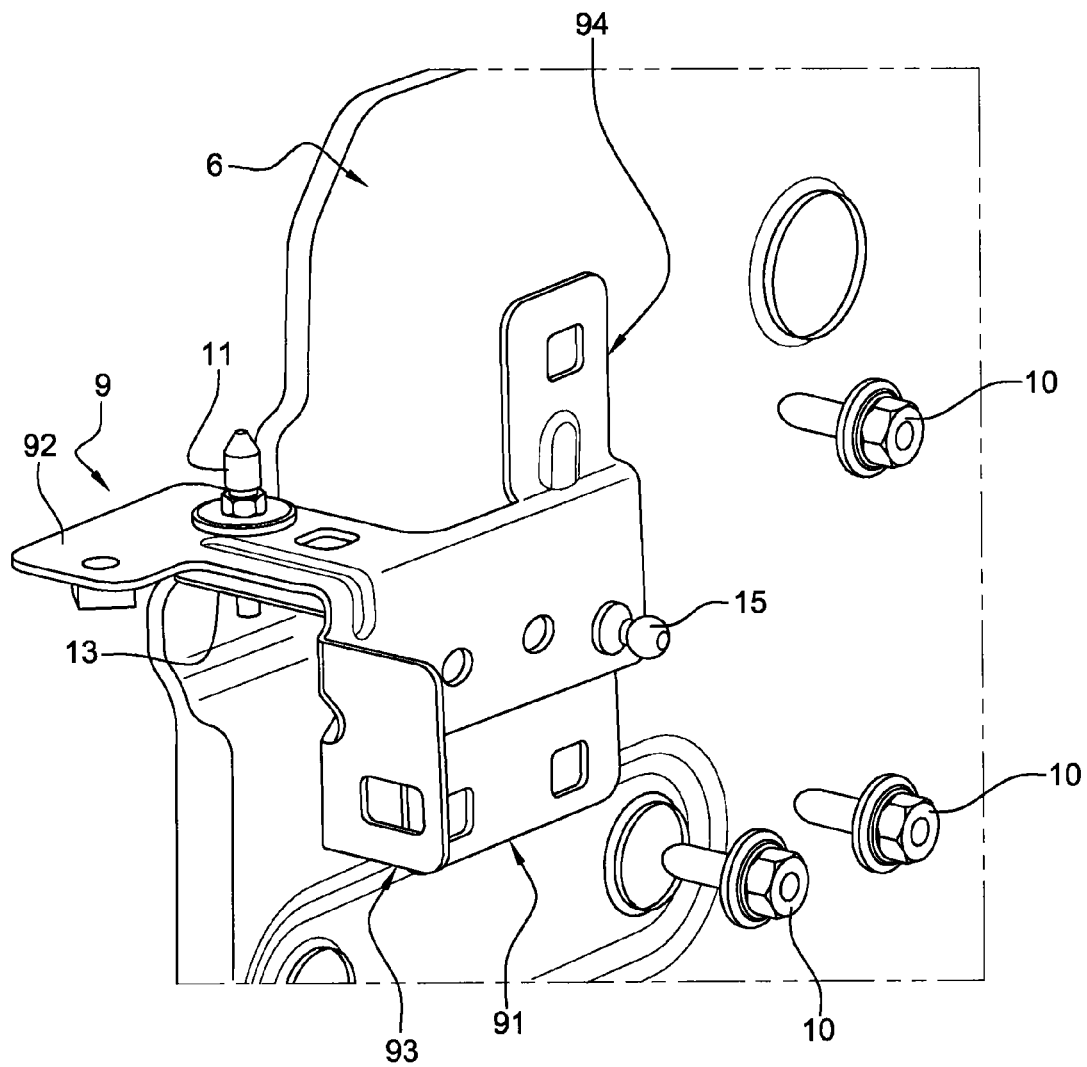

The invention will be better understood upon reading the following description of a non-limiting example of the invention and in light of the accompanying drawings, in which:

FIG. 1 shows an exploded perspective view of a front end of a motor vehicle according to the invention illustrating the hood, a front left headlight, a front left pillar lining, and a front left fender, FIG. 2 shows an enlarged view of details of the embodiment of FIG. 1, in which the structural front surface, the front left headlight, and the front left pillar lining are not shown, FIG. 3 shows a perspective view of a fixing bracket according to the invention, in relation to which the structural front surface is indexed, FIG. 4 shows an exploded perspective view of the fixing bracket of FIG. 3, and FIG. 5 shows a perspective view of the fixing bracket of FIG. 3 in a situation of approach for installation on a front pillar lining.

As indicated above, the orientations are given with reference to the conventional XYZ coordinate system of the vehicle, in which X represents the front-rear longitudinal direction of the vehicle, oriented toward the rear, Y represents the direction transverse to the vehicle, oriented toward the right, and Z represents the vertical direction upwards.

On the other hand, the notions "indexing", "placement in position" or "geometric placement" are considered as equivalent in the context of the invention and indicate that one element is positioned in relation to a second element.

FIG. 1 shows a front end of a motor vehicle having an arrangement specific to the invention. This front end of the vehicle comprises a structural front surface 1 forming a structure supporting engine-cooling elements (not shown), to which structure a front protective molding (not shown) of the vehicle and front headlights 2 are fixed. Only the front left headlight or optical block is shown in FIG. 1. The vehicle also comprises, in the front end thereof, a hood 3 hinged on hinge brackets 4 secured to the structure of the vehicle. The vehicle also comprises side fenders 5 (FIGS. 1 and 2) connected to front pillar linings 6 (FIGS. 1 and 5) of the structure of the vehicle. The structural front surface 1 is a structure having the general form of a frame oriented substantially vertically. It is composed typically of an upper beam 101 and a lower beam 102, connected to one another by substantially vertical side posts 103. In the illustrated example the beams are also connected to one another by a central beam 104 connected to the beams 101, 102 at the middle thereof. This structure is typically made of plastic material and comprises ribbed formations ensuring rigidity. This structure conventionally supports the radiator (not shown) associated with the cooling circuit of the vehicle and various components or elements, such as the headlights, the radiator grille (not shown), the protective molding (not shown), the hood lock (not shown), etc.

In the lower portion thereof the structural front surface 1 is connected to the lower brackets 7 secured to a front portion of the side frames of the vehicle (FIG. 2). A lower bracket 7 is provided on each side of the structural front surface 1. These lower brackets are shaped so as to ensure an indexing in the direction X by an abutment of the structural front surface 1 against a corresponding surface of the bracket 7. These elements are fixed by screwing.

In the upper portion, the structural front surface 1 comprises side arms 8 lengthening the upper beam 101 and extending opposite one another in the transverse direction Y. These arms 8 have opposite ends 81 fixed to the front pillar linings 6 by means of fixing brackets 9. These are shaped so as to ensure a direct indexing of at least one of the ends 81 on the fixing bracket 9 in the directions X and Z with a degree of freedom in the direction Y so as to allow an adjustment of the transverse position of the structural front surface relative to the fixing bracket 9. The arrangement according to the invention makes it possible to position the structural front surface 1 in a determined transverse position by placing a template (not shown) between the hood 3 and one of the ends 81 of one of the side arms 8. The arrangement is identical and symmetrical on the two sides of the vehicle.

The fixing brackets 9 have the general form of an angle bracket comprising a vertical portion 91 extending in the plane XZ and screwed to a front pillar lining 6 of the vehicle, and a horizontal plate 92 extending at right angles in relation to the vertical position 91 toward the engine compartment of the vehicle. The fixing bracket 9 further comprises a vertical fin 93 extending in the plane YZ opposite the engine compartment, and lengthening the vertical portion 91 from a front edge thereof (FIGS. 3 and 4). The vertical portion 91 also comprises a vertical tab 94 extending above the vertical portion 91. The fixing brackets 9 are parts produced by deep drawing and bending. The plate 92 and the upper tab 94 are connected to the upper edge of the vertical portion 91 respectively at the front and rear thereof. The fixing brackets 9 are fixed to the corresponding front pillar lining 6 by three fixing screws 10 passing through the fixing bracket 9 in the direction Y (FIGS. 3 and 5). Two screws 10 pass through the vertical portion 91. One screw 10 passes through the upper tab 94. As illustrated in FIGS. 3 and 4, the plate 92 supports an indexing and clamping screw 11 cooperating with a tapped block 12, serving as a nut, detained in a cage 13 secured to the plate 92. The block 12 and the cage 13 are shaped so as to prevent rotation of the block 12 about a vertical axis. As shown in FIG. 4, the screw transitions from top to bottom into an upper indexing piece 111, a shoulder 112 ensuring planar contact against the plate 92, and a lower threaded portion 113 passing through the plate 92. The threaded portion 113 is screwed into a tapped orifice of the immobilizing block 12 held in the cage 13.

The end 81 of one of the side arms 8 of the structural front surface 1 comprises an opening extending in the direction Y, into which the screw 11 is introduced, ensuring an indexing in the directions X (by contact with the transverse edges of the opening) and Z (by pressing of the end 81 on the upper surface of the plate 92) whilst enabling an adjustment of the transverse position of the structural front surface 1 in the direction Y.

It is assumed that the hood 3 placed in position on the hinge brackets 4 thereof is correctly positioned in relation to the structure of the vehicle. In fact, the hood is installed and fixed during "metalworking" operations, during which the body in white is assembled so as to form the structure, with good control of the geometry due to the repeatability provided by the automated/robotized means. Consequently, the hood 3 is used advantageously as a reference in order to then position the structural front surface 1. The template is then positioned directly between the hood 3 and the structural front surface 1, which predetermines the position thereof in the direction Y. Once this position has been obtained, the screw 11 is screwed into the block 12 in order to secure and definitively fix the end 81 of the arm 8 to the fixing bracket 9.

As explained, the end 81 of the arm 8 is placed in geometric position in the longitudinal direction X directly by the indexing and clamping screw 11 because the opening receiving this screw 11 is oriented in the direction Y and does not allow any degree of freedom in the direction X (apart from installation clearances). Likewise, the placement in geometric position of the end 81 of the arm 8 in the vertical direction Z is ensured directly by planar contact with the plate 92, on each side of the structural front surface 1.

Likewise, the hood 3 is correctly positioned in relation to the structure by repeatable factory means during metalworking operations, and the fenders 5 are also positioned and fixed on structural elements assembled during metalworking operations. Thus, the relative position of the structural front surface and of each fender 5 is controlled. By then positioning each headlight 2 in relation to the structural front surface 1 and in relation to a corresponding fender, the relative positioning of each headlight in relation to the hood and in relation to the associated fender is consequently controlled. This correct positioning implies that the clearances and alignments between the hood 3, the headlights 2, and the fenders 5 are controlled and correctly distributed, in particular between the two sides of the vehicle.

The front headlights 2 are placed in geometric position in relation to the structural front surface 1 as follows:

Each front headlight 2 is fixed to the fixing bracket 9 by connection means shaped so as to ensure a direct indexing in the directions X and Z.

The headlight 2 is placed in geometric position in the direction X by pressing directly on a front surface of the vertical fin 93. The headlight 2 is placed in geometric position in the direction Z by pressing directly on an upper surface of the plate 92.

The headlight 2 is also fixed to the fin 5 by a strip (FIG. 2) shaped so as to ensure a direct indexing in the direction X. The headlight 2 cooperates resting on a front surface of this strip 14.

The headlight is also fixed to the lower portion of the structural front surface 1 by connection means shaped so as to ensure a direct indexing in the directions X, Y and Z.

The headlight 2 is also fixed in the rear portion thereof to a hinge bracket 4 of the hood 3. The fixing is shaped so as to ensure an indexing in the directions Y and Z.

The fixing of the headlight 2 on each of these elements is ensured by screwing. It is noted that the fixing of the rear portion of the headlight 2 on the hinge bracket 4 is not blocked in the direction X so as to meet the regulations concerning pedestrian impact (the elements must sink in an unhindered manner in the direction X when a force exceeds a predetermined force threshold). Likewise, for the same reasons associated with pedestrian impact, the fixings of the headlight 2 on the fixing bracket 9, on the strip 14 and on the lower portion of the structural front surface 1 are shaped so as to rupture in the longitudinal direction X when a force applied exceeds a predetermined force threshold.

As illustrated in FIGS. 3 to 5, the fixing brackets 9 additionally comprise, on the vertical portion 91, a connection piece 15 extending in the direction Y, opposite the engine compartment. This piece 15 has a spherical end making it possible to ensure a ball joint connection with a hood balancing jack (not shown) placed between said hood and the fixing bracket 9.

Of course, the invention is not limited to the embodiments or variants described above and includes all technical equivalents of these means.

The invention claimed is:

1. A method for producing and installing a front end of a motor vehicle including an arrangement including a structural front surface forming a structure supporting engine-cooling elements, to which structure a front protective molding of the vehicle and front headlights are fixed, the vehicle further including a hood hinged on hinge brackets secured to the structure of the vehicle, and side fenders connected to front pillar linings of the structure of the vehicle, the structural front surface being fixed in the lower portion thereof to the structure of the vehicle via lower brackets secured to the side frames of the vehicle, shaped to ensure an indexing in the longitudinal direction, the structural front surface including, in an upper portion, side arms, of which the opposite ends are fixed to the front pillar linings by fixing brackets shaped to ensure a direct indexing of at least one of the ends in the longitudinal and vertical directions with a degree of freedom in the transverse direction allowing an adjustment of said end to a transverse position determined relative to the hood, the method comprising:

placing in position, assembling, and fixing structural parts of the vehicle, including front pillar linings, hood hinge brackets, fixing brackets, and lower brackets of the structural front surface;

placing the hood position on the hinge brackets;

placing the structural front surface in position by a direct indexing of at least one of ends of the arms in the longitudinal and vertical directions with a degree of freedom in the transverse direction allowing an adjustment of the end in the transverse direction;

adjusting the end and the structural front surface in the transverse direction to a transverse position determined relative to the hood by placing a template between the hood and the end;

fixing ends of the side arms on the fixing brackets in the determined transverse position by tightening an indexing and clamping screw cooperating with a tapped block, and also fixing the lower portion of the structural front surface on the lower brackets.

2. The production and installation method as claimed in claim 1, further comprising:

fixing each headlight on a corresponding fixing bracket via connection means shaped to ensure a direct indexing in the longitudinal and vertical directions;

fixing each headlight on a corresponding fender via a strip secured to the fender, shaped to ensure a direct indexing in the longitudinal direction;

fixing each headlight on a lower portion of the structural front surface by connection means shaped to ensure a direct indexing in the longitudinal, transverse, and vertical directions;

fixing each headlight on a corresponding hood hinge by connection means shaped to ensure a direct indexing in the transverse and vertical directions.

3. The production and installation method as claimed in claim 1, wherein each front headlight is fixed to the fixing bracket by connection means shaped to ensure a direct indexing in the longitudinal and vertical directions, is fixed to the fender by a strip shaped to ensure a direct indexing in the longitudinal direction, is fixed to the lower portion of the structural front surface by connection means shaped to ensure a direct indexing in the longitudinal, transverse, and vertical directions, and is fixed to a hinge bracket of the hood shaped to ensure an indexing in the transverse and vertical directions.

4. The production and installation method as claimed in claim 1, wherein each fixing hinge comprises a vertical portion extending in a longitudinal vertical plane, fixed to a front pillar lining of the vehicle, a horizontal plate extending at right angles toward the engine compartment of the vehicle, the plate including the screw cooperating with the tapped block detained in a cage secured to the plate to prevent rotation thereof about a vertical axis, the screw configured to be threaded in an adjustment opening formed on the corresponding end of one of the side arms of the structural front surface, the opening extending in the transverse direction when the structural front surface is installed on the structure of the vehicle.

5. The production and installation method as claimed in claim 1, wherein each fixing bracket includes a vertical fin extending in a transverse vertical plane opposite the engine compartment from a front edge of the vertical portion, a headlight being indexed in the longitudinal direction whilst bearing against the vertical fin and fixed thereon by a screw passing through an opening formed in the fin in the transverse direction.

6. The production and installation method as claimed in claim 1, wherein each fixing bracket includes, on the vertical portion thereof, a connection piece extending in the direction opposite the engine compartment, the piece including a spherical end configured to ensure a ball joint connection with a hood balancing jack placed between the hood and the fixing bracket.

7. The production and installation method as claimed in claim 1, wherein each fixing bracket is a part formed by deep drawing and bending, fixed to the corresponding front pillar lining by three fixing screws passing through the vertical portion and also a fixing tab extending above the vertical portion.

\* \* \* \* \*